(12) United States Patent
Hirohara et al.

(10) Patent No.: US 10,597,283 B2
(45) Date of Patent: Mar. 24, 2020

(54) ERRONEOUS REFUELING PREVENTION DEVICE

(71) Applicant: YACHIYO INDUSTRY CO., LTD., Saitama (JP)

(72) Inventors: Takeshi Hirohara, Tochigi (JP); Daesung Kim, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 16/312,195

(22) PCT Filed: May 12, 2017

(86) PCT No.: PCT/JP2017/018099
§ 371 (c)(1),
(2) Date: Dec. 20, 2018

(87) PCT Pub. No.: WO2017/221585
PCT Pub. Date: Dec. 28, 2017

(65) Prior Publication Data
US 2019/0352173 A1 Nov. 21, 2019

(30) Foreign Application Priority Data
Jun. 20, 2016 (JP) .................................. 2016-122074

(51) Int. Cl.
*B67D 7/34* (2010.01)
*B60K 15/04* (2006.01)

(52) U.S. Cl.
CPC .............. *B67D 7/344* (2013.01); *B60K 15/04* (2013.01); *B60K 2015/0461* (2013.01); *B60K 2015/0483* (2013.01)

(58) Field of Classification Search
CPC .... B60K 2015/0461; B60K 2015/0483; B60K 15/04; B67D 7/344
(Continued)

(56) References Cited

U.S. PATENT DOCUMENTS

| 8,763,656 B2 * | 7/2014 | Ichimaru ................ B60K 15/04 141/350 |
| 2006/0096662 A1 | 5/2006 | King et al. |
| 2007/0034287 A1 | 2/2007 | Groom et al. |

FOREIGN PATENT DOCUMENTS

| GB | 2431634 A | 5/2007 |
| JP | 2006-103679 A | 4/2006 |

(Continued)

OTHER PUBLICATIONS

International Search Report and Written Opinion of the International Search Report for PCT/JP2017/018099 dated Jul. 18, 2017.

*Primary Examiner* — P. Macade Nichols
(74) *Attorney, Agent, or Firm* — Kenealy Vaidya LLP

(57) ABSTRACT

An erroneous refueling prevention device restricts or allows insertion of a refueling gun into a refueling passage depending on an outer diameter of the refueling gun. The device includes a flap configured to open or close the refueling passage by a turn of the flap about a first turn pivot; and a switch configured to be unlocked from the flap by a turn of the flap to a half-opened state, and to turn about a second turn pivot. The switch includes a protrusion detector configured to, in response to the turn, project to a position where the protrusion detector faces the refueling passage. The switch restricts or allows a turn of the flap from the half-opened state to a fully-opened state, depending on a turn amount of the switch to be determined by a contact relationship between the protrusion detector and the refueling gun.

3 Claims, 10 Drawing Sheets

(58) Field of Classification Search
USPC .......................................................... 141/350
See application file for complete search history.

(56) References Cited

FOREIGN PATENT DOCUMENTS

| | | |
|---|---|---|
| JP | 2007-261492 A | 10/2007 |
| JP | 2008-49952 A | 3/2008 |
| JP | 2011-213235 A | 10/2011 |
| JP | 5286423 B2 | 9/2013 |
| JP | 5385288 B2 | 1/2014 |
| WO | 2017/056914 A1 | 4/2017 |

* cited by examiner

FIG. 1
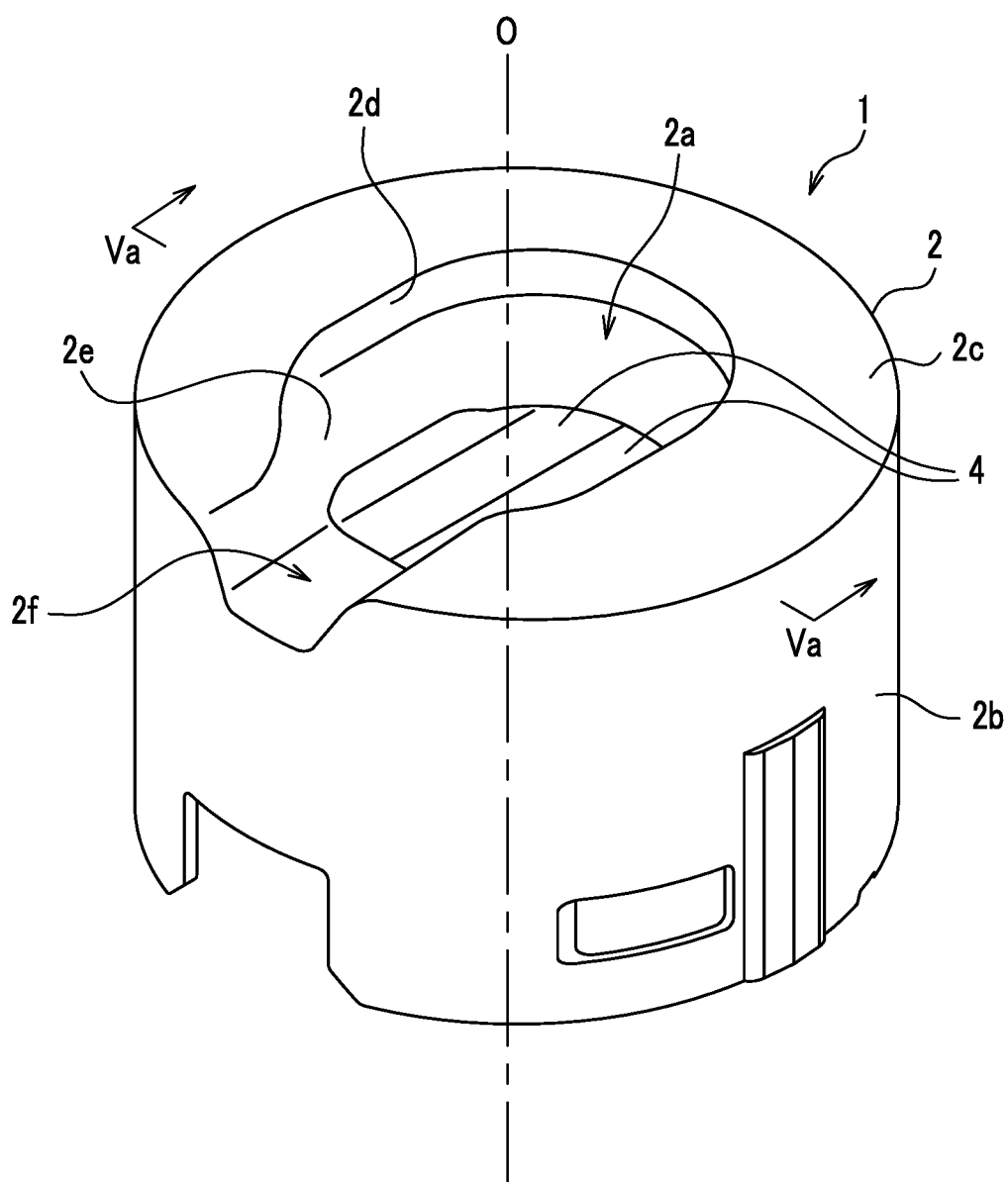
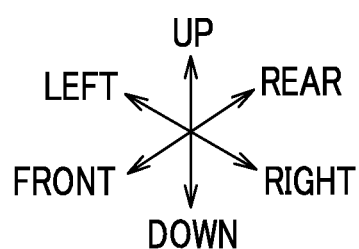

FIG. 8
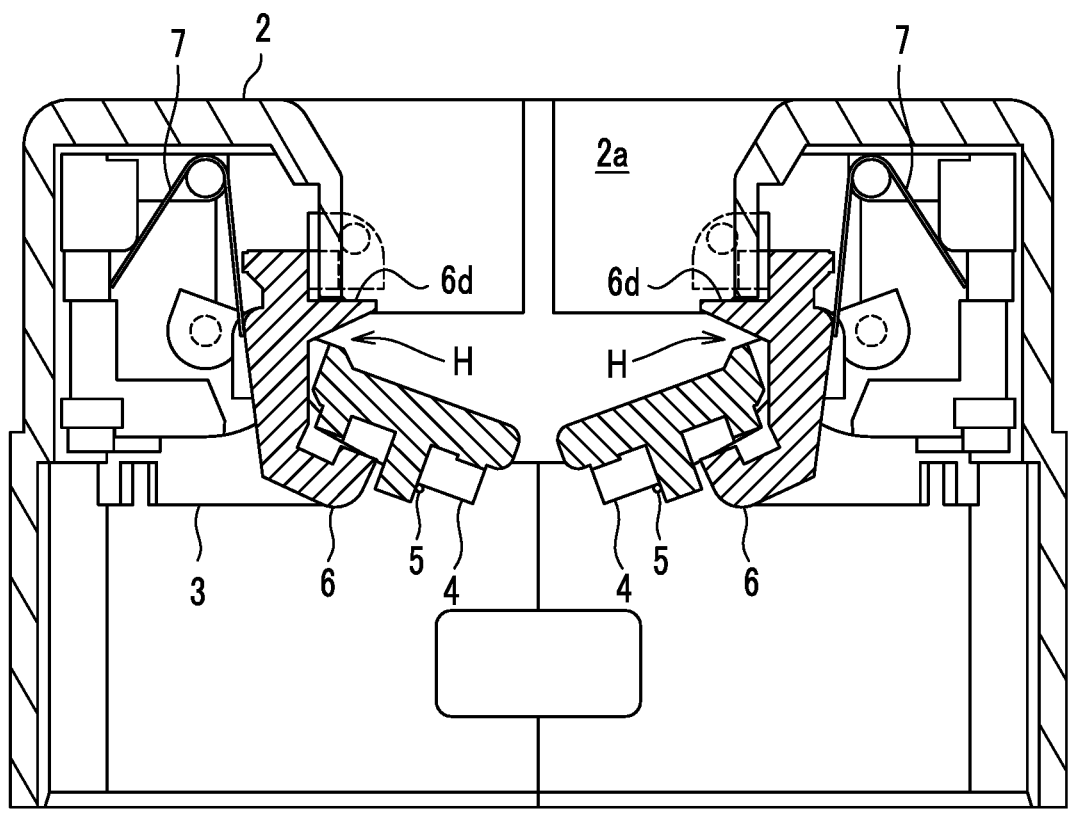
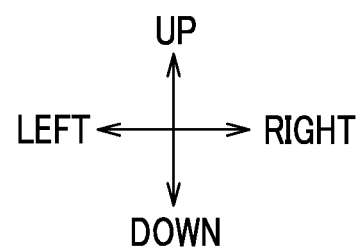

FIG. 9
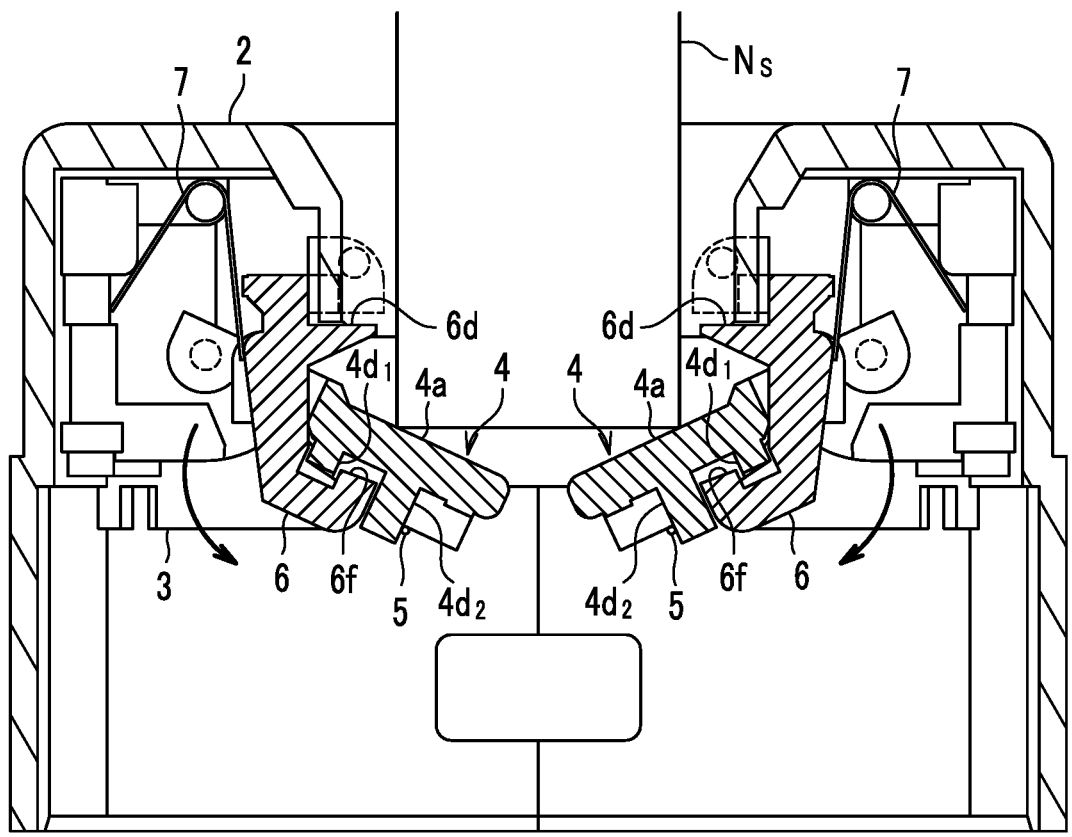
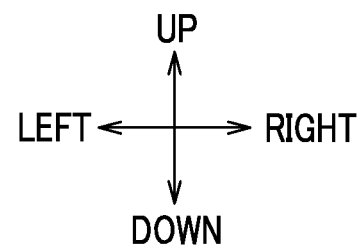

FIG. 10
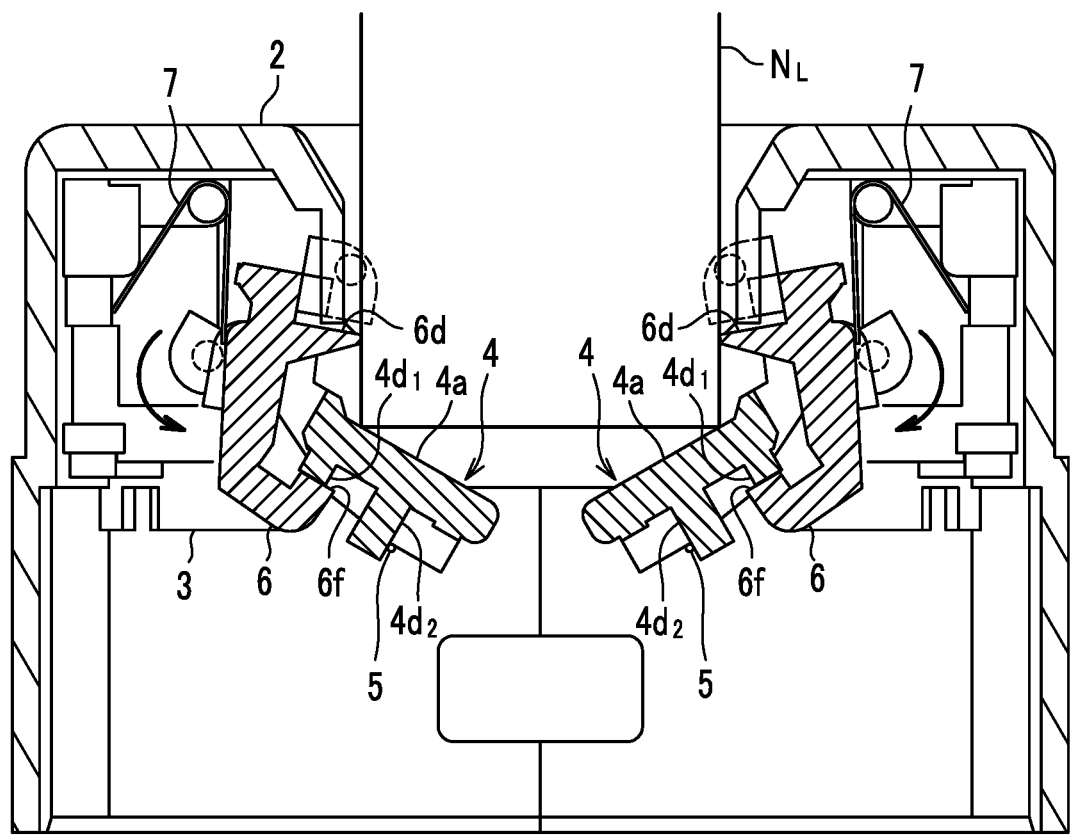
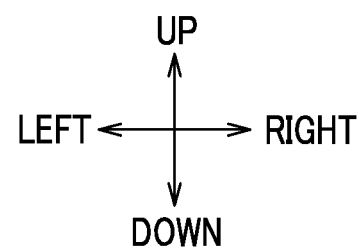

FIG. 11
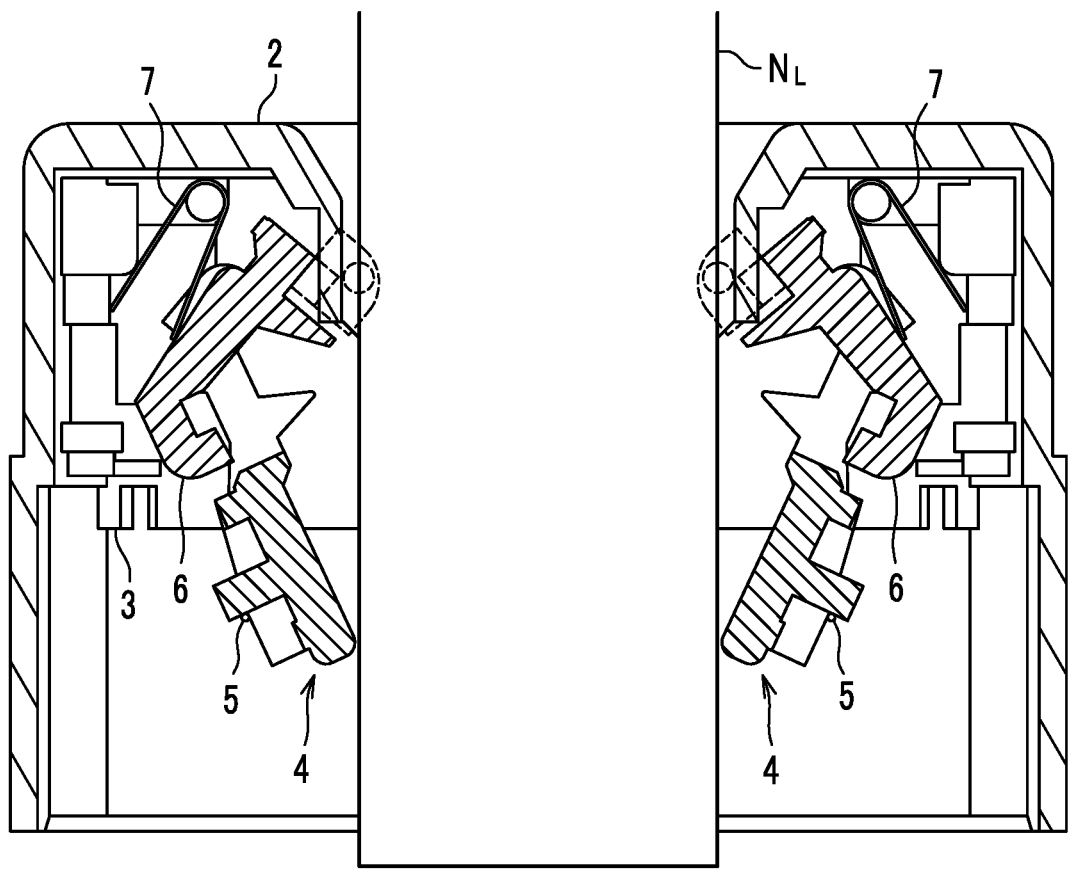
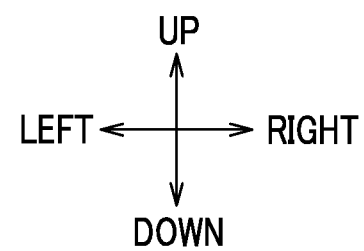

ERRONEOUS REFUELING PREVENTION DEVICE

CROSS-REFERENCE TO RELATED APPLICATIONS

This application is a U.S. National Stage Application under 35 U.S.C § 371 of International Patent Application No. PCT/JP2017/018099 filed 12 May 2017, which claims the benefit of priority to Japanese Patent Application No. 2016-122074 filed 20 Jun. 2016, the disclosures of all of which are hereby incorporated by reference in their entireties.

TECHNICAL FIELD

The present invention relates to an erroneous refueling prevention device.

BACKGROUND ART

Known is an erroneous refueling prevention device which is provided to a refueling passage in a vehicle such as an automobile, and which rejects the insertion of a refueling gun with a small diameter into the refueling passage, and allows the insertion of a refueling gun with a large diameter into the refueling passage. For example, Patent Literature 1 discloses an erroneous refueling prevention device which, when an insertion pressure of a refueling gun slides sliders to the left and right, unlocks a flap valve from the corresponding slider, and allows the opening operation of the flap valve and the insertion of the refueling gun. The sliders include taper surfaces on their parts with which an end portion of the refueling gun comes into contact, and the taper surfaces serve as a detector for detecting the outer diameter of the refueling gun.

CITATION LIST

Patent Literature

Patent Literature 1: Japanese Patent No. 5286423

SUMMARY OF INVENTION

Technical Problem

The technique disclosed in Patent Literature, however, involves a problem that the exposure of the taper surfaces of the sliders makes foreign objects more likely to adhere to the taper surfaces. The adhesion of foreign objects to the taper surfaces serving as the detector may allow a refueling gun with a small outer diameter to be inserted into the refueling passage, and may cause a malfunction.

The present invention has been made from this viewpoint. An object of the present invention is to provide an erroneous refueling prevention device which is capable of reducing malfunctions.

Solution to Problem

To solve the above problems, the present invention is an erroneous refueling prevention device which restricts or allows insertion of a refueling gun into a refueling passage depending on an outer diameter of the refueling gun, the erroneous refueling prevention device including: a flap configured to open or close the refueling passage by a turn of the flap about a first turn pivot; and a switch configured to be unlocked from the flap by a turn of the flap to a half-opened state, and to turn about a second turn pivot. The switch includes a protrusion detector configured to, in response to the turn, project to a position where the protrusion detector faces the refueling passage. The switch is characterized by restricting and allowing a turn of the flap from the half-opened state to a fully-opened state, depending on a turn amount of the switch to be determined by a contact relationship between the protrusion detector and the refueling gun.

According to the present invention, the protrusion detector is hidden behind the flap while the flap is in the closed state, but when an insertion pressure of the inserted refueling gun changes the flap from the closed state to the half-opened state, the protrusion detector projects to the position where the protrusion detector faces the refueling passage. In other words, the protrusion detector is not exposed until the refueling gun is inserted into the refueling passage. This makes it possible to prevent foreign objects from adhering to the protrusion detector, and accordingly to reduce malfunctions.

In addition, it is preferable that when the refueling gun comes into contact with the protrusion detector, the switch allows a turn of the flap from the half-opened state to the fully-opened state by moving to a non-engagement position where the switch is out of engagement with the flap with a small turn amount of the switch. When the refueling gun does not come into contact with the protrusion detector, the switch restricts the turn of the flap from the half-opened state to the fully-opened state by moving to an engagement position where the switch comes into engagement with the flap with a large turn amount of the switch.

This configuration makes it possible to restrict or allow the insertion of the refueling gun into the refueling passage depending on whether the refueling gun comes into contact with the protrusion detector. In other words, a threshold of the outer diameter of the refueling gun for allowing the insertion is associated with the turn amount of the switch which brings the protrusion detector into contact with the refueling gun, and thereby the simple structure can restrict or allow refueling guns with various outer diameters into the refueling passage.

Furthermore, it is preferable that the erroneous refueling prevention device further include a first biasing member configured to bias the flap in a direction of closing the refueling passage, and a second biasing member configured to bias the switch in a direction of making the protrusion detector project to the refueling passage.

This configuration enables the flap to be held at a closed position in the refueling passage, and the protrusion detector to instantly project to the refueling passage once the flap is put into the half-opened state.

Advantageous Effects of Invention

The erroneous refueling prevention device according to the present invention is capable of reducing malfunctions.

BRIEF DESCRIPTION OF DRAWINGS

FIG. 1 is an external appearance perspective view of an erroneous refueling prevention device according to an embodiment of the present invention.

FIG. 8 is a front cross-sectional view of the erroneous refueling prevention device as half-opened.

FIG. 9 is a front cross-sectional view of the erroneous refueling prevention device with the flaps and the switches in engagement with each other.

FIG. 10 is a front cross-sectional view of the erroneous refueling prevention device with the flaps and the switches out of engagement with each other.

FIG. 11 is a front cross-sectional view of the erroneous refueling prevention device as fully opened.

DESCRIPTION OF EMBODIMENTS

Hereinafter, embodiments of the present invention will be described in detail with reference to the accompanying drawings.

An erroneous refueling prevention device 1 illustrated in FIG. 1 according to the present invention is a device provided in a refueling passage, as well as configured to block the insertion of a refueling gun with a small diameter (for example, a refueling gun for gasoline) into the refueling passage, and to allow the insertion of a refueling gun with a large diameter (for example, a refueling gun for light oil) into the refueling passage. The refueling gun is inserted into the erroneous refueling prevention device 1 set in the refueling passage, from above to under in FIG. 1. "Up," "down," "left," "right," "front," and "rear" in the following descriptions correspond to arrows in FIG. 1. These directions are defined for the sake of explanation, and do not limit the present invention.

Figure 2:
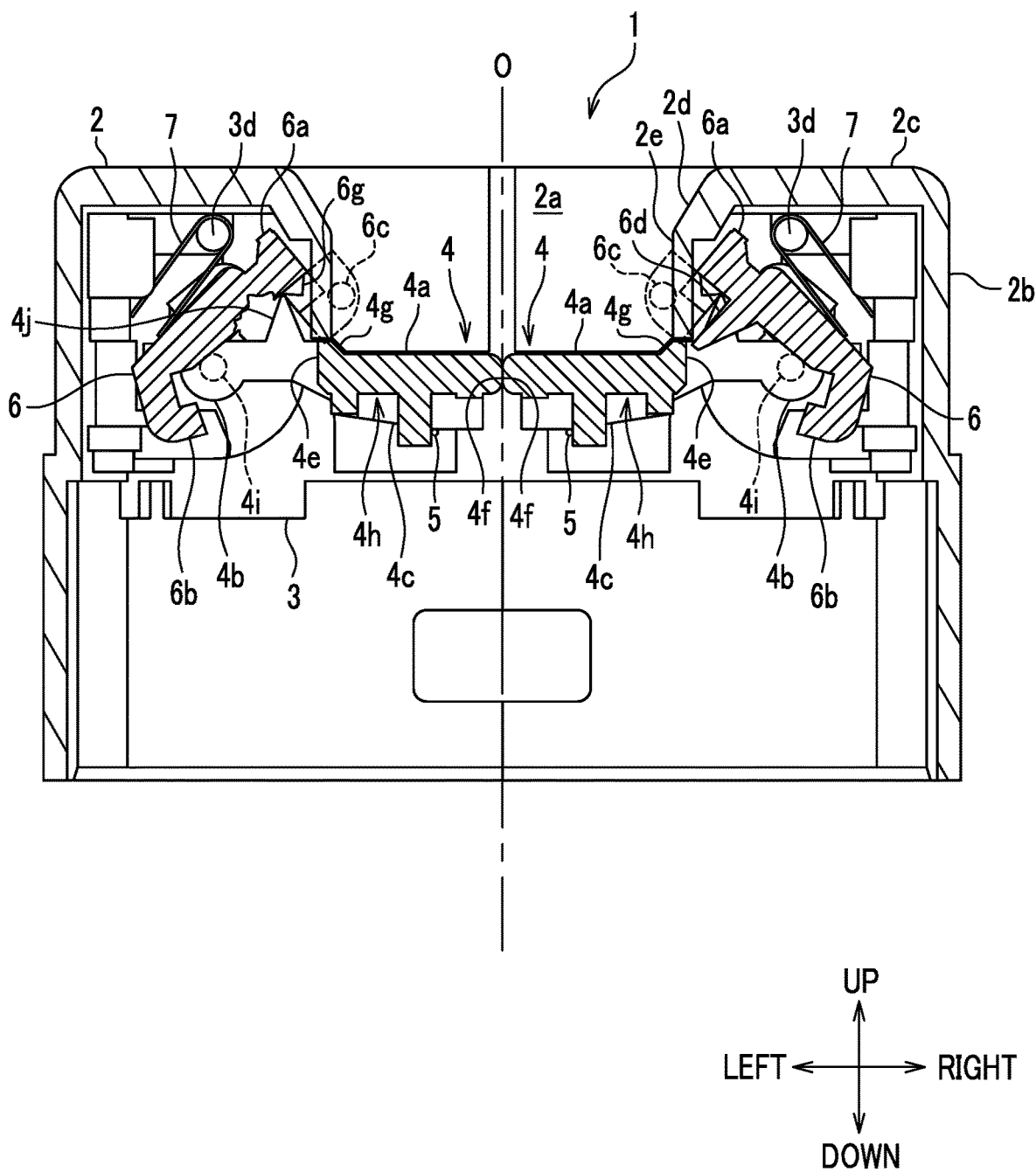
FIG. 2 is a front cross-sectional view taken along the Va-Va line of FIG. 1, and provides a cutaway view of a left switch.

As illustrated in FIG. 2, the erroneous refueling prevention device 1 includes mainly, a housing 2, a bracket 3, a pair of flaps 4, 4, a pair of first biasing members 5, 5, a pair of switches 6, 6, and a pair of second biasing member 7, 7.

The pair of flaps 4, 4, the pair of first biasing members 5, 5, the pair of switches 6, 6, and the pair of second biasing member 7, 7 are mirror-symmetrical with a respect to a front-rear direction axis including an axial center O which is the center of the refueling passage.

<Housing 2>

The housing 2 is a housing member for containing the other components of the erroneous refueling prevention device 1 in its inside. As illustrated in FIG. 2, the housing 2 includes mainly, an outer cylinder 2b, an end portion 2c, an inclination portion 2d, and an inner cylinder 2e. A circular insertion opening 2a through which to insert the refueling gun is opened in the inside of the inner cylinder 2e. When the erroneous refueling prevention device 1 is provided to the refueling passage, the insertion opening 2a serves as a part of the refueling passage.

The length of the inner cylinder 2e in the insertion direction is shorter than that of the outer cylinder 2b in the insertion direction. The lower end of the inner cylinder 2e touches the flaps 4, 4. A hollow portion is formed between the inner cylinder 2e and the outer cylinder 2b.

The end portion 2c is a ring-shaped plate member formed extending between the end of the inner cylinder 2e and the end of the outer cylinder 2b. As illustrated in FIG. 1, a groove portion 2f extending from the insertion opening 2a to the outer circumference of the end portion 2c is formed in a front part of the end portion 2c. The inclination portion 2d is a part formed extending in the circumferential direction along a boundary part between the end portion 2c and the inner cylinder 2e, and configured to facilitate the insertion of the refueling gun into the insertion opening 2a.

<Bracket 3>

The bracket 3 is a member formed in the shape of a short cylinder, and supporting the flaps 4, 4 and the switches 6, 6 turnably. The bracket 3 is fitted into a space between the inner cylinder 2e and the outer cylinder 2b.

Figure 3:
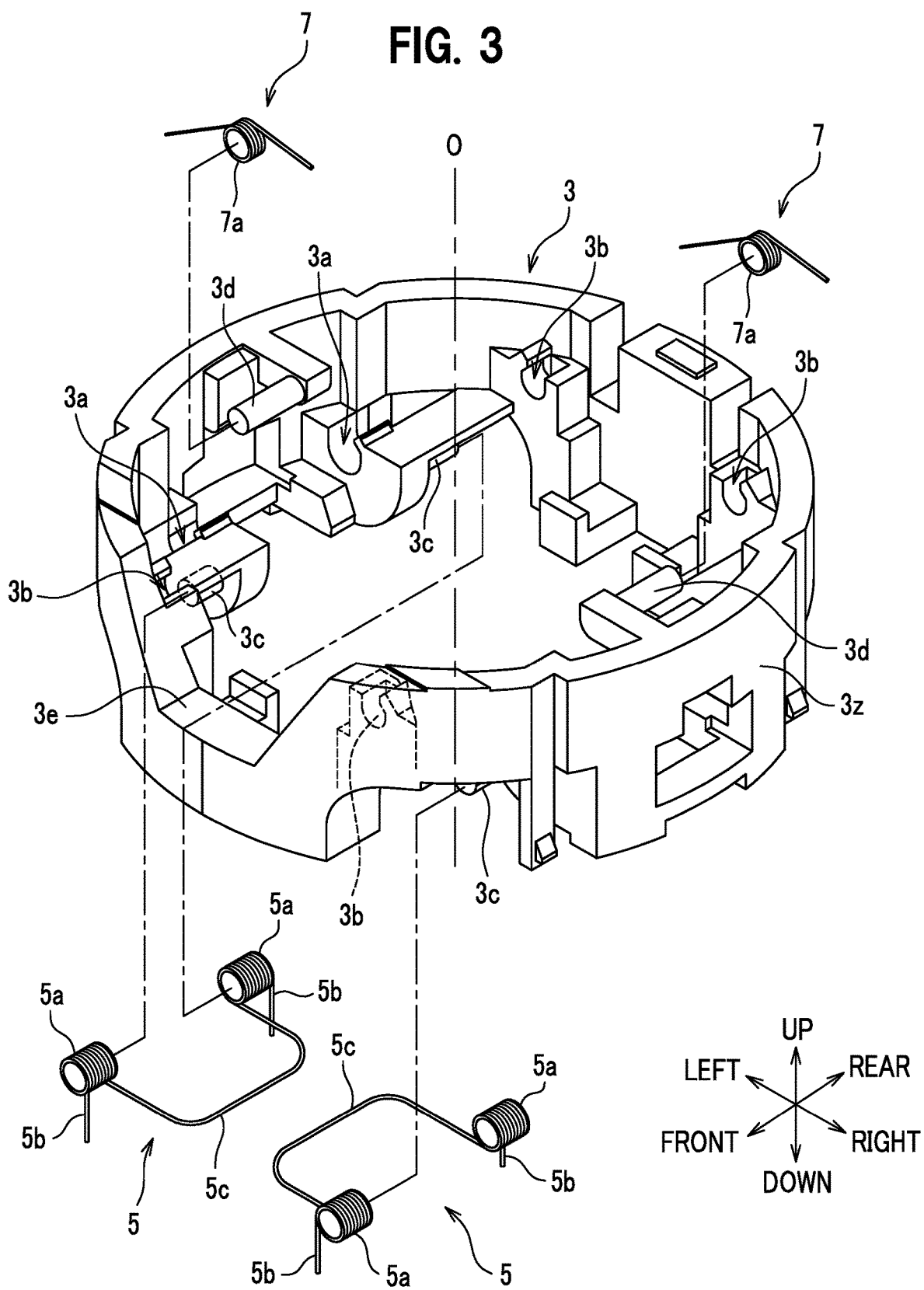
FIG. 3 is a perspective view of a bracket, first biasing members and second biasing members.

As illustrated in FIG. 3, the bracket 3 includes mainly, a cylindrical portion 3z formed in the shape of a cylinder, four first support portions 3a (only two of which are illustrated in FIG. 3), four second support portions 3b, four first spring shaft portions 3c (only three of which are illustrated in FIG. 3), and two second spring shaft portions 3d. The first support portions 3a, the second support portions 3b, the first spring shaft portions 3c and the second spring shaft portions 3d are formed inside the cylindrical portion 3z. A recess portion 3e corresponding to the groove portion 2f (see FIG. 1) of the housing 2 is formed in a front part of the cylindrical portion 3z. The structure of the bracket 3 inside the cylindrical portion 3z is point-symmetrical with respect to the axial center O which is the center of the refueling passage. For this reason, only a half of the structure will be described unless otherwise indicated.

Figure 5:
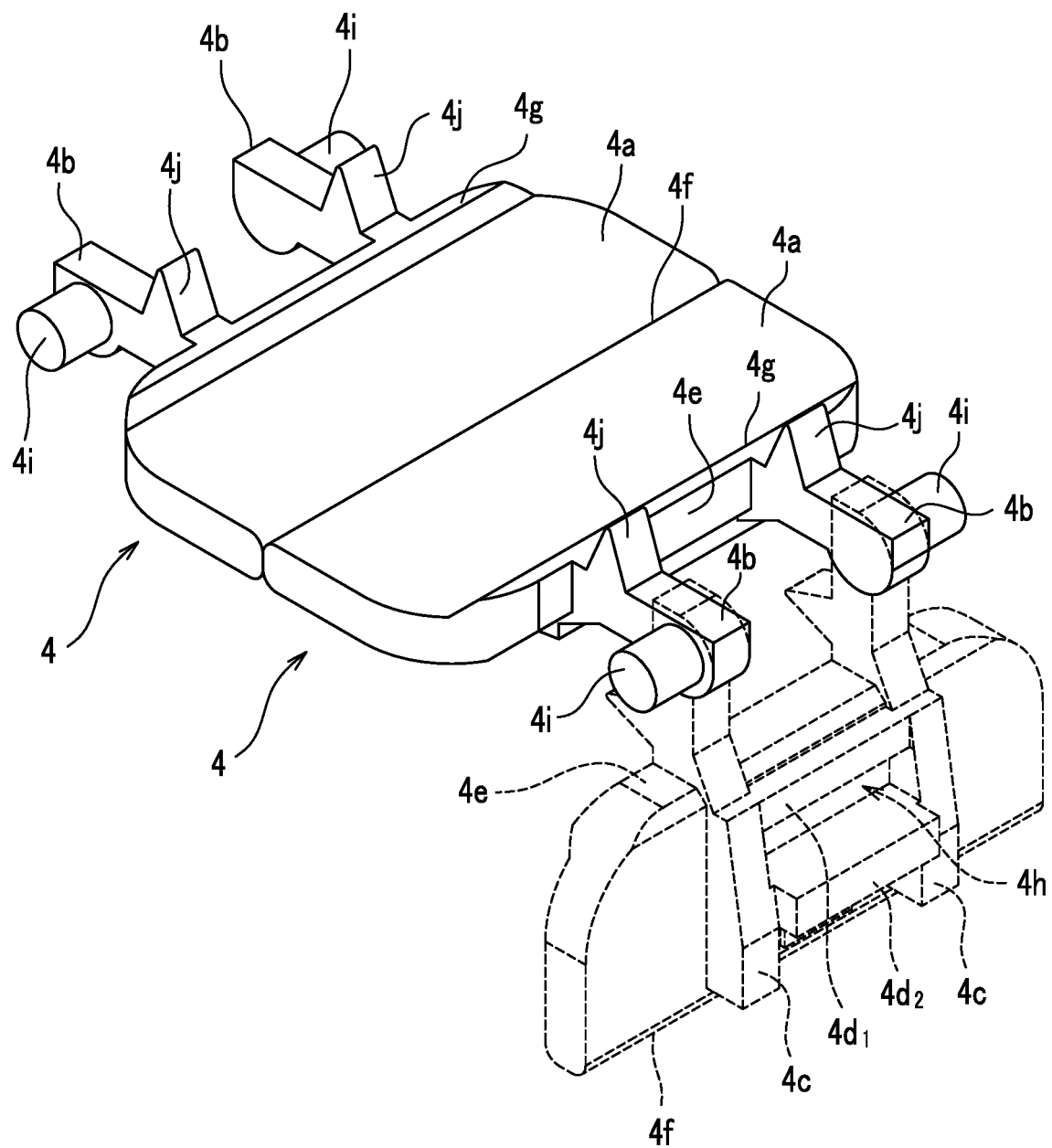
FIG. 5 is a perspective view of the flaps.

The first support portions 3a, 3a arranged in the front-rear direction are parts for pivotally supporting turn shaft portions 4i, 4i of one of the flaps 4 illustrated in FIG. 5. The second support portions 3b, 3b arranged in the front-rear direction are parts for pivotally supporting turn shaft portions 6c, 6c of one of the switches 6 illustrated in FIG. 6. The axial centers of the first support portions 3a, 3a and the axial centers of the second support portions 3b, 3b are in parallel with the front-rear direction. The second support portions 3b, 3b are formed closer to the axial center O and upper than the first support portions 3a, 3a.

Figure 4:
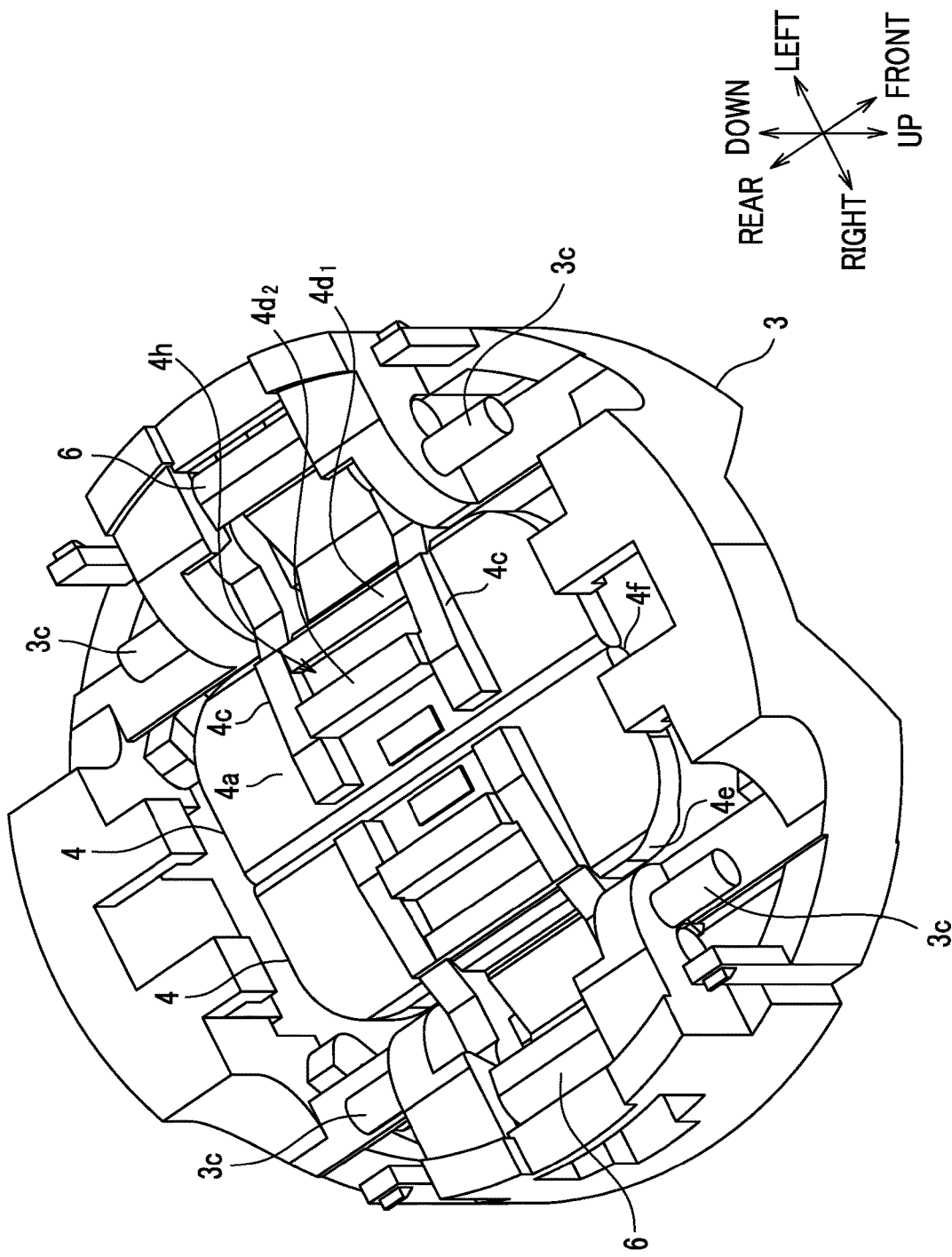
FIG. 4 is a perspective view of how the bracket, flaps and switches are assembled together, from a depth side in an insertion direction.

The first spring shaft portions 3c, 3c arranged in the front-rear direction are parts which are inserted through cylindrical coil portions 5a, 5a of one of the first biasing members 5 (see FIG. 4 as well). Each second spring shaft portion 3d is a part which is inserted through a cylindrical coil portion 7a of a corresponding one of the second biasing members 7. The axial centers of the first spring shaft portions 3c, 3c and the axial center of the second spring shaft portion 3d are in parallel with the front-rear direction. The first spring shaft portions 3c, 3c are formed in the lower part of the cylindrical portion 3z, while the second spring shaft portion 3d is formed in the upper part of the cylindrical portion 3z.

<Flap 4>

As illustrated in FIG. 2, the flaps 4, 4 constitute a double-swinging valve for opening and closing the refueling passage (the insertion opening 2a in this respect). Each flap 4 is turnable in the insertion direction of the refueling gun. The flaps 4, 4 have the same structure, and descriptions will be provided for one flap 4 unless otherwise indicated.

As illustrated in FIG. 5, each flap 4 includes mainly, an opening and closing plate portion 4a, and a pair of attachment portions 4b, 4b. Dashed lines in FIG. 5 depict one flap 4 as turned. In the following descriptions, an upward-facing surface of the flap 4 at the attachment position (the surface facing the incoming side in the insertion direction of the refueling gun) will be referred to as a "front surface," while a downward-facing surface of the flap 4 at the attachment position (the surface facing the outgoing side in the insertion direction of the refueling gun) will be referred to as a "rear surface."

While staying at its closed position, the opening and closing plate portion 4a extends in a direction substantially orthogonal to the axial center O. In its plan view, the opening and closing plate portion 4a is formed in the shape of a rectangle. The pair of attachment portions 4b, 4b are formed on an edge portion 4e of the opening and closing plate portion 4a on the side of one long side of the opening and closing plate portion 4a. The edge portion 4f of the opening and closing plate portion 4a on the side of the other long side of the opening and closing plate portion 4a is formed in the shape of a straight line. The pair of the flaps 4, 4 close the refueling passage when the edge portions 4f, 4f of pair of the flaps 4, 4 meet together (see FIG. 2). Incidentally, the edge portion 4f of each opening and closing plate portion 4a is chamfered to smoothly turn.

A ridge-shaped protrusion 4g is formed on the front surface of the opening and closing plate portion 4a on the side of the edge portion 4e, and extending along the edge portion 4e. As illustrated in FIG. 2, the protrusion 4g includes: a contact surface configured to come into contact with the lower end of the inner cylinder 2e of the housing 2; and an inclination surface which inclines to the insertion direction of the refueling gun (the direction of the axial center O). The inclination surface inclines higher toward the edge portion 4e. While staying at their closed positions, the protrusions 4g are in contact with the lower end of the inner cylinder 2e, and the spaces inside and outside the housing 2 are thereby separated from each other. Thus, while the opening and closing plate portions 4a remain closed, no foreign object enters the housing 2 through the insertion opening 2a.

As illustrated in FIG. 5, a pair of first extending-out portions 4c, 4c, a second extending-out portion $4d_1$, and a third extending-out portion $4d_2$ are formed on the rear surface of the opening and closing plate portion 4a.

The first extending-out portions 4c, 4c have the same shape, and are each formed as a ridge-shape protrusion which is shaped substantially like a prism. Each first extending-out portion 4c is arranged extending from the edge portion 4e toward the edge portion 4f, and in parallel with the short sides of the opening and closing plate portion 4a. In addition, the first extending-out portion 4c has a certain height from the edge portion 4f to the vicinity of the center of the first extending-out portion, and becomes gradually lower toward the edge portion 4e from the vicinity of the center of the first extending-out portion. The first extending-out portion 4c on the side of the edge portion 4f does not reach the edge portion 4f. While the edge portions 4f, 4f of the pair of the flaps 4, 4 meet together, the first extending-out portions 4c, 4c are spaced away from each other (see FIG. 2). The space distance between the first extending-out portions 4c, 4c may be set in a range in which the space distance does not hinder the opening and closing plate portions 4a, 4a from turning.

The second and third extending-out portions $4d_1$, $4d_2$ are each formed as a ridge-shape protrusion which is shaped as a prism. The second and third extending-out portions $4d_1$, $4d_2$ are arranged in parallel with the edge portion 4e and the edge portion 4f (that is, in parallel with the long sides of the opening and closing plate portion 4a). The height of the second extending-out portion $4d_1$ is lower than that of the third extending-out portion $4d_2$. In addition, the height of the second extending-out portion $4d_1$ is lower than that of the first extending-out portions 4c on the side of the edge portion 4e. Furthermore, the height of the third extending-out portion $4d_2$ is higher than that of the first extending-out portions 4c on the side of the edge portion 4f. The two ends of the second extending-out portion $4d_1$ and the two ends of the third extending-out portion $4d_2$ reach the side surfaces of the respective first extending-out portions 4c, 4c. Thereby, a recess portion 4h surrounded by the pair of first extending-out portions 4c, 4c, and the second and third extending-out portions $4d_1$, $4d_2$ is formed on the rear surface of the opening and closing plate portion 4a.

The attachment portions 4b, 4b are provided projecting from the edge portion 4e of the opening and closing plate portion 4a in a direction substantially orthogonal to the edge portion 4e. The attachment portions 4b, 4b are provided in parallel with each other with a space in between. The interval between the attachment portions 4b, 4b is set in a range in which the interval allows a projection detector 6d (see FIG. 6) of the switch 6 to be accommodated between the attachment portions 4b, 4b. The turn shaft portion 4i is formed on the outer surface of each attachment portion 4b on the side of a distal end of the attachment portion. The turn shaft portion 4i is turnably fitted into the corresponding first support portion 3a (see FIG. 3). Thereby, each flap 4 turns around the turn shaft portions 4i, 4i in the insertion direction of the refueling gun.

Furthermore, a protrusion 4j shaped in a triangle in a side view is formed on the surface of each attachment portion 4b on the base side of the attachment portion. As illustrated in FIG. 2, when the flaps 4 are closed, a distal end of each protrusion 4j comes into contact with a base-side of a protrusion 6g of the corresponding switch 6. Thereby, the switch 6 is held (locked) at its closed position illustrated in FIG. 2.

<First Biasing Member 5>

As illustrated in FIG. 3, the first biasing members 5, 5 are springs for normally biasing the flaps 4, 4 to turn the flaps in their respective closing directions. Although no particular restriction is imposed on the springs to be used as the first biasing members 5, 5, the first biasing members 5, 5 according to the embodiment are each a torsion spring. Each first biasing member 5 includes mainly, a pair of cylindrical coil portions 5a, 5a, fixation portions 5b, 5b, and a pressing portion 5c.

The pair of first spring shaft portions 3c, 3c facing each other in the front-rear direction are inserted through the respective coil portions 5a, 5a. The fixation portions 5b, 5b are fixed to appropriated parts of the bracket 3. The pressing portion 5c is installed in a way that puts the pressing portion in contact with a part of the rear surface of the corresponding opening and closing plate portion 4a as being at its closed position (see FIG. 2), and produces a biasing force which works in a direction opposite to the turn of the opening and closing plate portion 4a in the insertion direction.

<Switch 6>

Figure 6:
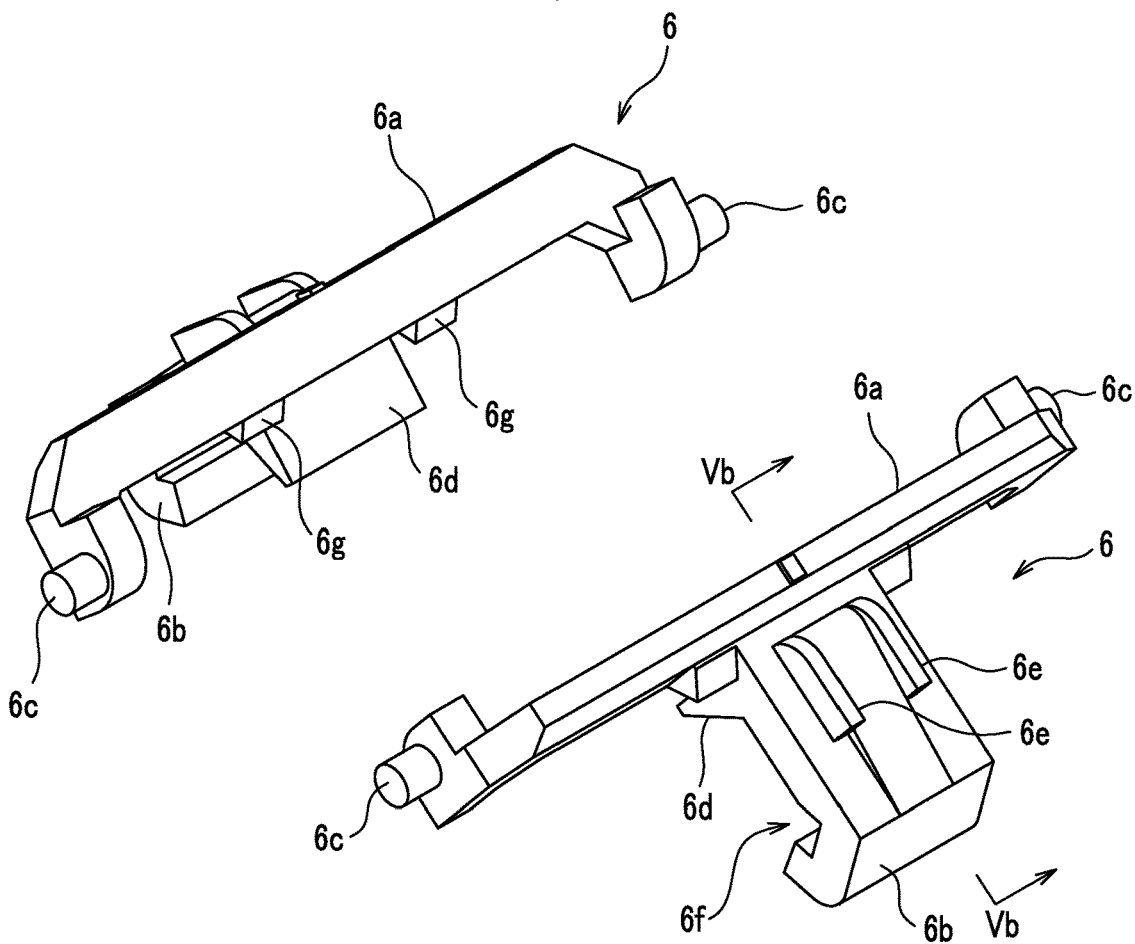
FIG. 6 is a perspective view of the switches.

The switches 6, 6 illustrated in FIG. 6 are restriction members for restricting the turn (opening) of the flaps 4, 4 depending on the outer diameter of a refueling gun to be inserted into the refueling passage. As the flaps 4, 4 turn from their closed portions illustrated in FIG. 2 in the insertion direction of the refueling gun (in response to the turn of the flaps 4, 4), the switches 6, 6 turn in the direction opposite to the turn direction of the flaps 4, 4. Although discussed in detail later, the amount of turn of the switches 6, 6 is set corresponding to the outer diameter of a refueling gun to be inserted into the insertion opening 2a. The turn amount for inserting a refueling gun with a large diameter (for example, a refueling gun for light oil) into the insertion opening is larger than the turn amount for inserting a refueling gun with a small diameter (for example, a refueling gun for gasoline) into the insertion opening.

In this embodiment, when a refueling gun with a small diameter (for example, a refueling gun for gasoline) is inserted into the insertion opening 2a, the switches 6, 6 restrict the turn of the flaps 4, 4. This comes from the following two configurations. The first configuration is that the turn central axis of each flap 4 and the turn central axis of the corresponding switch 6 are placed out of line (offset from each other), but not coaxial with each other. The second configuration is that once the amount of turn of the switch 6 exceeds a predetermined amount, the switch 6 locks the flap 4.

The switches 6, 6 have the same structure, and descriptions will be provided for one switch 6 unless otherwise indicated. As illustrated in FIG. 6, each switch 6 includes mainly, an attachment portion 6a, and a restriction portion 6b. In the following descriptions, the surface of the attached switch 6, which faces the flap 4, will be referred to as a "facing surface," while the surface of the attached switch 6, which does not face the flap 4, will be referred to as a "non-facing surface."

The attachment portion 6a is formed in the shape of a long plate, and turn shaft portions 6c, 6c are formed on the outer surfaces of the two ends of the attachment portion 6a. The turn central axes of the turn shaft portions 6c, 6c are coaxial with each other. The turn shaft portions 6c, 6c are turnably fitted into the second support portions 3b, 3b (see FIG. 4). Thereby, each switch 6 turns about the turn shaft portions 6c.

Figure 7:
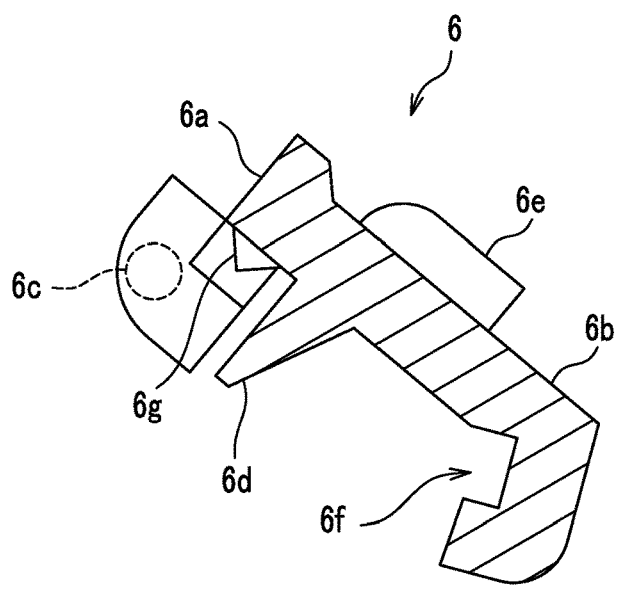
FIG. 7 is a cross-sectional view taken along the Vb-Vb line of FIG. 6.

Furthermore, the protrusions 6g, 6g shaped in a triangle in their side views are formed near the longitudinal center of the attachment portion 6a, and on the two sides of the protrusion detector 6d. As illustrated in FIG. 7, the height of each protrusion 6g is smaller than the amount of protrusion of the protrusion detector 6d. While each flap 4 is closed, the lower surface (base-side surface) of the corresponding protrusion 6g is in contact with the protrusion 4j of the flap 4, as illustrated in FIG. 2. Thereby, the switch 6 is held at its closed position illustrated in FIG. 2. Furthermore, as the flap 4 turns in the insertion direction of the refueling gun, the protrusion 6g comes out of contact with the protrusion 4j, and the attachment portion 6a accordingly becomes turnable.

The restriction portion 6b is formed in such a shape that the end portion of its plate material is bent toward the facing surface, and is accordingly shaped substantially like, for example, the letter J in a cross-sectional view of the restriction portion (see FIG. 7). The protrusion detector 6d is formed on the facing surface of the restriction portion 6b on the side of the attachment portion 6a. The protrusion detector 6d is formed projecting from the interstice between the protrusions 6g, 6g. Moreover, a pair of ridge-shaped protrusions 6e, 6e are formed on the non-facing surface of the restriction portion 6b on the side of the attachment portion 6a, while a lock portion 6f is formed in the facing surface of the restriction portion 6b on the side of the distal end of the restriction portion.

The protrusion detector 6d is formed substantially in the shape of a plate, and its thickness becomes smaller toward its distal end. Thus, in its cross-sectional view, the protrusion detector 6d is shaped in substantially a triangle (see FIG. 7). While the flaps are at the closed positions illustrated in FIG. 2, the protrusion detector 6d are accommodated inside the housing 2. In response to the turn of the flap 4, a clearance is formed between the housing 2 and the flap 4, and the protrusion detector 6d accordingly passes through this clearance and projects to a position where the protrusion detector faces the refueling passage (the insertion opening 2a). At this moment, the distal end of the protrusion detector 6d comes into contact with the outer circumferential surface of the refueling gun as inserted into the insertion opening 2a, depending on the outer diameter of the refueling gun. The amount of protrusion of the protrusion detector 6d is set depending on the outer diameter of the refueling gun as inserted into the insertion opening 2a.

The end of the second biasing member 7 is fixed between the protrusions 6e, 6e. Thereby, the switch 6 is subjected to a biasing force from the second biasing member 7, and turns in the direction opposite to the turn direction of the flap 4. The lock portion 6f has a shape corresponding to the recess portion 4h which is formed on the rear surface of the opening and closing plate portion 4a. The lock portion 6f fits into the recess portion 4h formed on the rear surface of the opening and closing plate portion 4a when a refueling gun with a small diameter (for example, a refueling gun for gasoline) is inserted into the insertion opening 2a. On the other hand, the lock portion 6f does not fit into the recess portion 4h when a refueling gun with a large diameter (for example, a refueling gun for light oil) is inserted into the insertion opening 2a. These happen since the turn axis of the flap 4 and the turn axis of the switch 6 are placed out of line (offset from each other). Detailed descriptions will be provided in a section entitled the working.

<Second Biasing Member 7>

The second biasing members 7, 7 illustrated in FIG. 2 are springs for normally biasing the switches 6, 6 to come closer to the flaps 4, 4 in their respective directions. Although no particular restriction is imposed on the springs to be used as the second biasing members 7, 7, the second biasing members 7, 7 according to this embodiment are each a torsion spring, as illustrated in FIG. 3. The second spring shaft portion 3d of the bracket 3 is inserted through the coil portion 7a. One end of each second biasing member 7 is fixed between the protrusions 6e, 6e of the switch 6, while the other end of the second biasing member 7 is fixed to an appropriate portion of the bracket 3 (see FIG. 2).

Next, descriptions will be provided for how the erroneous refueling prevention device 1 according to this embodiment works.

<While Closed>

FIG. 2 illustrates how the flaps 4, 4 are closed. Although the turn biasing forces of the first biasing members 5, 5 in the closing direction are normally applied to the flaps 4, 4, the flaps 4, 4 are held at their predetermined closed positions since each opening and closing plate portion 4a is in contact with the lower end of the inner cylinder 2e of the housing 2. At the same, although the second biasing members 7, 7 normally bias the switches 6, 6 to come closer to the flaps 4, 4 in their directions, the switches 6, 6 are held (locked) at their predetermined positions because the bases of the protrusions 6g are in contact with the protrusions 4j of the flap 4. Incidentally, in this state, no gaps are formed between the inner cylinder 2e and the flaps 4, 4. For this reason, no foreign object enters the housing 2. This prevents a foreign object from adhering to the protrusion detector 6d.

<Opening Operation (Half-Opened State)>

FIG. 8 illustrates how the flaps 4, 4 are slightly turned (opened) by the insertion of a refueling gun (not illustrated) with either a small diameter or a large diameter into the refueling passage (the insertion opening 2a) (hereinafter referred to as a "half-opened state). In this state, the flaps 4, 4 are turned to form clearances H, H between the housing 2 and the flaps 4, 4. Furthermore, the turn of the flap 4 brings the protrusion 6g of the switch 6 and the protrusion 4j of the flap 4 out of contact with each other, and the protrusion detector 6d accordingly passes through the clearance H and projects to the position where the protrusion detector faces the refueling passage (the insertion opening 2a). The amount of protrusion of the protrusion detector 6d is set depending on the outer diameter of the inserted refueling gun. Specifically, when a refueling gun with a small diameter is inserted, the amount of protrusion of the protrusion detector 6d is large. On the other hand, when a refueling gun with a large diameter is inserted, the amount of protrusion of the protrusion detector 6d is small.

<Opening Operation (Restricted State)>

FIG. 9 illustrates how the insertion of a refueling gun $N_S$ with a small diameter into the refueling passage is restricted (hereinafter referred to as a "restricted state"). In this state, the protrusion detector 6d is not in contact with the refueling gun $N_S$ with a small diameter. Furthermore, in this state, the lock portion 6f fits into the interstice between the second and third extending-out portions $4d_1$, $4d_2$ (the recess portion 4h (see FIG. 4)) formed on the rear surface of the opening and closing plate portion 4a. Thereby, the flaps 4, 4 are brought into engagement with the switches 6, 6, and prevent the turn of the switches 6, 6 or vice versa. For this reason, the flaps 4, 4 do not turn more from the state illustrated in FIG. 9, and the insertion of the refueling gun $N_S$ with a small diameter into the refueling passage is restricted. When the flaps 4, 4 are brought into engagement with the switches 6, 6, the flaps 4, 4 may be opened within such a range that the flaps does not allows the refueling gun $N_S$ with a small diameter to pass through between the flaps, for example, may be half-opened or opened more than half-opened (but not fully opened).

<Opening Operation (Allowed State)>

FIGS. 10 and 11 illustrate how the insertion of a refueling gun $N_L$ with a large diameter into the refueling passage is allowed (hereinafter referred to as an "allowed state"). In this state, as illustrated in FIG. 10, the refueling gun $N_L$ with a large diameter comes into contact with the protrusion detector 6d, and the amount of turn of the switches 6, 6 is limited to a predetermined amount or less. For this reason, the lock portion 6f of each switch 6 comes into contact with the second extending-out portions $4d_1$ instead of fitting into the interstice between the second and third extending-out portions $4d_1$, $4d_2$ (the recess portion 4h (see FIG. 4)) formed on the rear surface of the opening and closing plate portion 4a. Thereby, the flaps 4, 4 do not come into engagement with the switches 6, 6, and do not prevent the turn of the switches 6, 6 or vice versa. Accordingly, the flaps 4, 4 can turn more from the state illustrated in FIG. 10 in the insertion direction of the refueling gun against the biasing forces of the first and second biasing members 5, 7.

When the refueling gun $N_L$ with a large diameter is further pushed into the refueling passage from the state illustrated in FIG. 10, the flaps 4, 4 are brought into a state where the flaps are opened (hereinafter referred to as an "opened state"), as illustrated in FIG. 11. In this state, the insertion of the refueling gun $N_L$ with a large diameter into the refueling passage is allowed, and the refueling can be performed using the refueling gun $N_L$. In this point, while the flaps 4, 4 are turning in the insertion direction of the refueling gun, the switches 6, 6 are turning integrally with the flaps 4, 4 in the same direction. Thus, the switches 6, 6 return to positions which are substantially the same as the positions at which the switches 6, 6 stay while the flaps 4, 4 are closed as illustrated in FIG. 2.

According to the embodiment discussed above, although the flaps 4, 4 inhibit the turn of the protrusion detectors 6d of the switches 6, 6 while the flaps 4, 4 are in the closed state, the protrusion detectors 6d project to the positions where the protrusion detectors 6d face the refueling passage (the insertion opening 2a) when the inserted refueling gun N pushes the flaps 4, 4 from the closed state to the half-opened state. In this respect, the amount of protrusion of the protrusion detectors 6d depends on the outer diameter of the inserted refueling gun N. When the refueling gun $N_S$ with a small diameter is inserted, the amount of protrusion of the protrusion detectors 6d is large. On the other hand, when the refueling gun $N_L$ with a large diameter is inserted, the amount of protrusion of the protrusion detectors 6d is small.

Thus, the switches 6, 6 turn by an amount corresponding to the amount of protrusion of the protrusion detectors 6d. when the refueling gun $N_S$ with a small diameter is inserted, the switches 6, 6 stop at the positions (engagement positions) where the switches 6, 6 block the turn of the flaps 4, 4. On the other hand, when the refueling gun $N_L$ with a large diameter is inserted, the switches 6, 6 stop at the positions (non-engagement positions) where the switches 6, 6 allow (do not block) the turn of the flaps 4, 4.

According to the embodiment, thus, when the refueling gun $N_S$ with a small diameter is inserted, the insertion of the refueling gun into the refueling passage is restricted. When the refueling gun $N_L$ with a large diameter is inserted, the insertion of the refueling gun into the refueling passage is allowed. In this respect, while the flaps 4, 4 are in the closed state, the protrusion detectors 6d of the switches 6, 6 are not exposed to the refueling passage (the insertion opening 2a). This makes it possible to prevent a foreign object from adhering to the protrusion detectors 6d. For this reason, the size of the outer diameter of the refueling gun N can be detected accurately, and the erroneous insertion of the refueling gun $N_S$ is restricted. Accordingly, the erroneous refueling can be reduced.

Moreover, according to the embodiment, the lock portion 6f of the switch 6 fits into the interstice between the second and third extending-out portions $4d_1$, $4d_2$ (the recess portion 4h) formed on the rear surface of the opening and closing plate portion 4a of the flap 4. This strengthens the engagement between the lock portion 6f and the recess portion 4h.

Furthermore, according to the embodiment, the pair of flaps 4, 4 are of a double-swinging type, and the inserted refueling gun turn the two flaps 4, 4 at the same time instead of pushing and turning only one flap 4. This makes it possible to prevent an excessive force from being applied to only one flap 4, and to reduce failure.

Although the foregoing descriptions have been provided for the embodiment of the present invention, the invention is not limited to this embodiment. The embodiment may be modified depending on the necessity within the scope not departing from the gist or spirit of the present invention.

In the embodiment, the pair of first biasing members 5, 5 apply the biasing forces to the pair of flaps 4, 4, while the pair of second biasing members 7, 7 apply the biasing forces to the pair of switches 6, 6. However, no particular restriction is imposed on the kind or the number of biasing members for applying the biasing forces to the flaps 4, 4 and the switches 6, 6. For example, a configuration may be employed in which a single biasing member applies a biasing force to both the flap 4 and the switch 6.

Furthermore, in the embodiment, the pair of flaps 4, 4 of double-swinging type are assumed as the components for opening and closing the refueling passage (the insertion opening 2a in this case). However, the configuration for opening and closing the refueling passage is not limited to this. For example, a configuration may be employed in which three or more flaps 4 open and close the refueling passage. Otherwise, a configuration may be employed in which a single flap opens and closes the refueling passage. In these configurations, it is desirable that the number of switches 6 be equal to the number of flaps 4.

Besides, in the embodiment, the flap 4 and the switch 6 are brought into engagement with each other by fitting the lock portion 6f of the switch 6 into the interstice between the second and third extending-out portions $4d_1$, $4d_2$ (the recess portion 4h) formed on the rear surface of the opening and closing plate portion 4a. However, the method of bringing the flap 4 and the switch 6 into engagement with each other is not limited to this. For example, a configuration may be employed in which only either of the second and third extending-out portions $4d_1$, $4d_2$ brings the flap 4 and the switch 6 into engagement with each other. Another configuration may be employed.

1 erroneous refueling prevention device
2 housing
3 bracket
4 flap
5 first biasing member
6 switch
7 second biasing member

The invention claimed is:

1. An erroneous refueling prevention device which restricts or allows insertion of a refueling gun into a refueling passage depending on an outer diameter of the refueling gun,
the device comprising:
a flap configured to open or close the refueling passage by a turn of the flap about a first turn pivot; and
a switch configured to be unlocked from the flap by a turn of the flap to a half-opened state, and to turn about a second turn pivot,
wherein the switch comprises a protrusion detector configured to, in response to the turn, project to a position where the protrusion detector faces the refueling passage,
wherein the switch restricts or allows a turn of the flap from the half-opened state to a fully-opened state, depending on a turn amount of the switch to be determined by a contact relationship between the protrusion detector and the refueling gun.

2. The erroneous refueling prevention device according to claim 1,
wherein, when the refueling gun comes into contact with the protrusion detector, the switch allows a turn of the flap from the half-opened state to the fully-opened state by moving to a non-engagement position where the switch is out of engagement with the flap with a small turn amount of the switch, and
wherein, when the refueling gun does not come into contact with the protrusion detector, the switch restricts the turn of the flap from the half-opened state to the fully-opened state by moving to an engagement position where the switch comes into engagement with the flap with a large turn amount of the switch.

3. The erroneous refueling prevention device according to claim 1, further comprising:
a first biasing member configured to bias the flap in a direction of closing the refueling passage; and
a second biasing member configured to bias the switch in a direction of making the protrusion detector project to the refueling passage.

* * * * *